P. H. SANDS.
DENTAL APPARATUS FOR REMOVING WAX FROM THE TEETH.
APPLICATION FILED DEC. 27, 1911.

1,031,737.

Patented July 9, 1912.

WITNESSES:
John C. Sanders
Albert F. Heuman

INVENTOR:
Philip Henry Sands

UNITED STATES PATENT OFFICE.

PHILIP HENRY SANDS, OF LOCHGELLY, SCOTLAND.

DENTAL APPARATUS FOR REMOVING WAX FROM THE TEETH.

1,031,737. Specification of Letters Patent. Patented July 9, 1912.

Application filed December 27, 1911. Serial No. 668,169.

*To all whom it may concern:*

Be it known that I, PHILIP HENRY SANDS, of Reid street, Lochgelly, in the county of Fife, Scotland, a subject of the King of Great Britain and Ireland, have invented new and useful Improvements in Dental Apparatus for Removing Wax from the Teeth, of which the following is a specification.

My said invention relates to dental appliances and has for its object to provide a holder or receptacle to receive the flask while the contents of latter, consisting of the teeth in their wax or equivalent temporary setting, are being subjected to the process of washing out whereby the wax is removed from the teeth.

At present the flask is usually placed in a sink or the like, but in the event of a tooth, or more than one tooth, becoming detached or separated from the plaster cast, it is not only very liable to be washed out of the flask into the sink, but also to pass into the waste pipe and so lost beyond recovery.

In carrying out my invention the flask holder consists of a vessel, preferably circular in plan and slightly larger in diameter than the flask. To retain the flask in position relative to the holder, the bottom of the latter is internally formed with a projecting piece, or ridge, against which the lower edge of the flask rests. The holder is provided with a spout, which communicates with the holder by a number of perforations, said perforations being of a size to readily allow the washed out material to escape, while at the same time trapping or preventing any solid substance of the size of a tooth escaping from the holder.

In order that my said invention and the manner of performing the same may be properly understood I hereunto append a sheet of explanatory drawings to be hereinafter referred to in describing my invention.

Figure 1:
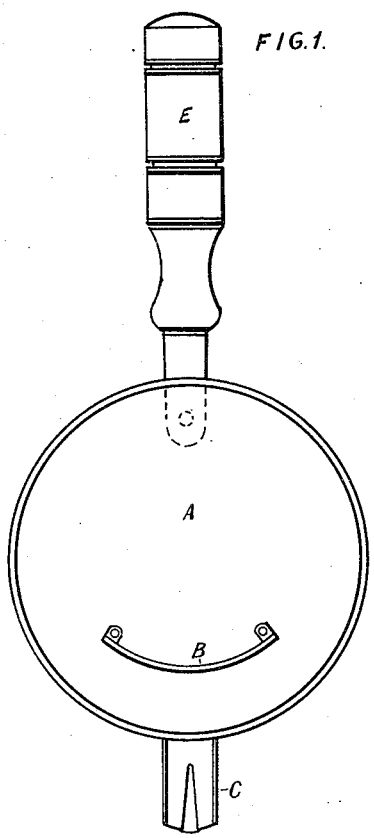
Figure 2:
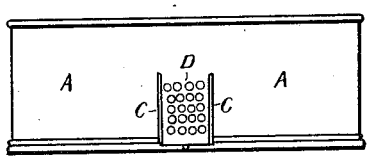
Figure 3:
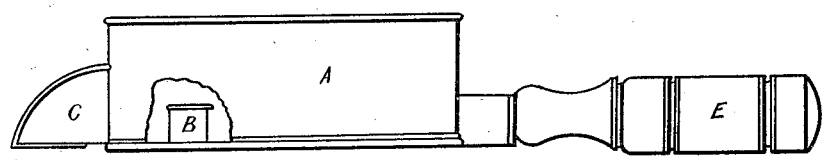

Figure 1, is a plan, and Figs. 2 and 3, are respectively a front and side elevation of my improved flask holder.

In these drawings the same reference letters are used to mark the same or like parts wherever they are repeated.

As shown in the drawings the flask holder consists of a vessel A, preferably circular in plan, and slightly larger in diameter than the flask (not shown). To retain the flask in position relative to the holder A, the bottom of the latter is internally fitted with, or has fixed to it, a projecting piece or ridge B, against which the lower edge of the flask rests when subjected to the washing-out operation.

The holder A, is provided with a spout C, which communicates with the holder by a number of perforations or small holes D, (Fig. 2) said perforations being of a size to readily allow the washed out material to escape while effectively trapping or preventing any solid substance of the size of a tooth escaping from the holder.

To facilitate using the holder A, it is provided with a handle E, and when in use the holder is preferably held in a slightly inclined position.

My improved flask holder is used as follows:—The flask is placed in the holder A, and rests against the ridge B, whereby a clear space is left all around the flask. Hot water, from any convenient receptacle, is now poured over the flask and the wax is melted out and flows into the holder, from which it escapes by the perforations D, into the spout C. By the use of my improved holder the washing-out operation is simply and expeditiously completed, and all risk of scalding the hands, and loss of a tooth, or teeth, is eliminated.

What I claim is:—

1. Dental flask holder comprising a vessel adapted to receive the flask, a ridge formed within the holder, and means for trapping loose teeth and allowing the waste material to escape from the holder, substantially as herein set forth.

2. Dental flask holder comprising a vessel adapted to receive the flask, a ridge formed within and a spout fitted outside the holder, and holes formed in the holder opposite the spout, substantially as herein set forth.

In testimony whereof I have signed my name to this specification in the presence of two subscribing witnesses.

PHILIP HENRY SANDS.

Witnesses:
GEORGE HUTTON,
GEORGE PATTERSON.

Copies of this patent may be obtained for five cents each, by addressing the "Commissioner of Patents, Washington, D. C."